(12) United States Patent
Eizenhoefer et al.

(10) Patent No.: US 7,516,473 B1
(45) Date of Patent: Apr. 7, 2009

(54) METHOD AND SYSTEM FOR SIGNALING

(75) Inventors: Alfons Eizenhoefer, Altdorf (DE); Peter Kuczynski, Nuremberg (DE); Said Tatesh, Swindon (GB)

(73) Assignee: Agere Systems Inc., Allentown, PA (US)

( * ) Notice: Subject to any disclaimer, the term of this patent is extended or adjusted under 35 U.S.C. 154(b) by 928 days.

(21) Appl. No.: 09/356,260

(22) Filed: Jul. 16, 1999

(30) Foreign Application Priority Data

Jul. 21, 1998 (EP) .................................. 98305811

(51) Int. Cl.
*H04N 7/14* (2006.01)
(52) U.S. Cl. ...................... 725/105; 370/345; 370/329; 370/321; 370/522; 455/515; 455/436
(58) Field of Classification Search ................. 714/752, 714/781; 370/320, 335, 329, 252, 522, 321, 370/345, 213; 375/280, 213, 259; 455/450, 455/432, 445, 561, 515, 436, 414; 395/500.47; 703/13, 21; 725/129, 125; 380/272; 713/169
See application file for complete search history.

(56) References Cited

U.S. PATENT DOCUMENTS

| | | | | | |
|---|---|---|---|---|---|
| 5,199,031 | A | * | 3/1993 | Dahlin ........................ | 370/329 |
| 5,491,719 | A | * | 2/1996 | Sellin et al. .................. | 375/213 |
| 5,546,464 | A | * | 8/1996 | Raith et al. .................. | 380/272 |
| 5,881,105 | A | * | 3/1999 | Balachandran et al. ...... | 375/258 |
| 5,926,755 | A | * | 7/1999 | Ghisler ....................... | 455/414 |
| 6,014,374 | A | * | 1/2000 | Paneth et al. ................ | 370/345 |
| 6,031,826 | A | * | 2/2000 | Hassan ....................... | 370/321 |
| 6,134,220 | A | * | 10/2000 | Le Strat et al. .............. | 370/252 |
| 6,138,020 | A | * | 10/2000 | Galyas et al. ................ | 455/436 |
| 6,172,968 | B1 | * | 1/2001 | Ransanen .................... | 370/329 |
| 6,286,122 | B1 | * | 9/2001 | Alanara ....................... | 714/781 |
| 6,295,302 | B1 | * | 9/2001 | Hellwig et al. .............. | 370/522 |
| 6,385,460 | B1 | * | 5/2002 | Wan ........................... | 455/515 |
| 6,418,558 | B1 | * | 7/2002 | Roberts et al. .............. | 725/129 |

FOREIGN PATENT DOCUMENTS

| | | |
|---|---|---|
| EP | 0 760 563 A1 | 3/1997 |
| FR | 2 724 509 | 9/1994 |
| GB | 2 296 161 A | 6/1996 |
| WO | WO 96/41493 | 12/1996 |

OTHER PUBLICATIONS

European Search Report, dated Feb. 16, 1999.

* cited by examiner

*Primary Examiner*—Paul L Rodriguez
*Assistant Examiner*—Kadasamy Thangavelu

(57) ABSTRACT

The present invention relates generally to the field of signaling of information, and particularly to a method and a system for signaling information in transmission systems.

Methods for signaling information in transmission systems do have certain disadvantages, like the use of an additional channel for signaling or the use of a large number of bits for signaling.

The present invention facilitates highly protected and highly reliable signaling requiring only a minimum of bits by inserting an individual signaling information into individual frames and by additionally partitioning signaling information and inserting the partitioned signaling information into different frames, i. e. spreading the signaling information.

19 Claims, 3 Drawing Sheets

| Frame Number | actual mode signalling codeword for downlink | mode Command bit for downlink | actual mode signalling codeword for uplink | Quality measurement bit for uplink | Action |
|---|---|---|---|---|---|
| 0 | 010 (Mode 3) | 0 (LSB) | 010 (Mode 3) | 0 (LSB) (assumed) | no change of codec mode |
| 1 | 010 (Mode 3) | 1 | 010 (Mode 3) | 1 (assumed) | no change of codec mode |
| 2 | 010 (Mode 3) | 0 (MSB) | 010 (Mode 3) | 1 (MSB) (assumed) | no change of codec mode, mode command word collected, quality word collected (=110) |
| 3 | 010 (Mode 3) | 1 (LSB) | 010 (Mode 3) | 1 (LSB) (assumed) | change of codec mode 3 to 2 |
| 4 | 010 (Mode 3) | 0 | 010 (Mode 3) | 0 (assumed) | change of codec mode 3 to 2 |
| 5 | 010 (Mode 3) | 0 (MSB) | 010 (Mode 3) | 1 (MSB) (assumed) | change of codec mode 3 to 2, mode command word collected, quality word collected (=101) |
| 6 | 001 (Mode 2) | 1 (LSB) | 001 (Mode 2) | 1 (LSB) (assumed) | change of codec mode 2 to 4 |
| 7 | 001 (Mode 2) | 1 | 001 (Mode 2) | 1 (assumed) | change of codec mode 2 to 4 |
| 8 | 001 (Mode 2) | 0 (MSB) | 001 (Mode 2) | 1 (MSB) (assumed) | change of codec mode 2 to 4, mode command word collected, quality word collected (=111) |

Fig. 2

METHOD AND SYSTEM FOR SIGNALING

CROSS-REFERENCE TO RELATED APPLICATION

This application claims priority of European Patent Application No. 98305811.6, which was filed on Jul. 21, 1998.

TECHNICAL FIELD

The present invention relates generally to the field of signaling of information, and particularly to a method and a system for signaling information in transmission systems.

BACKGROUND OF THE INVENTION

In transmission systems like radio networks, e. g. digital cellular radio networks according to the GSM-standard (Global System for Mobile communications), not only user data, e. g. encoded speech signals, are transmitted but also various information necessary for the operation of the network. The transmission of these information often is referred to as signaling. Signaling messages allow the fixed part of the network to discuss management of several issues either related to the user, e. g. call in progress indications, or concerning technical aspects of the communication, e. g. preparation and execution of a handover, with the mobile part of the network. The establishment and the release of a call also require signaling exchanges. In addition, signaling exchanges are even needed in cellular radio networks between fixed components of the network and mobile stations when no communication or call is in progress.

In order to transmit signaling information in parallel with the transmission of a user data flow, GSM offers two possibilities. Each traffic channel (TCH) for transporting the user data has an associated low rate channel, used for the transport of signaling called slow associated control channel (SACCH). It is used for non-urgent procedures, mainly the transmission of the radio measurement data needed for the decisions concerning handover. Other needs of associated signaling, e. g. authentication or the command to handover, make use of the TCH itself, called fast associated signaling. For fast associated signaling a so called stealing flag is used, which indicates that a part of the information or data contained in the indicated TCH frame contains signaling information. The stealing flag indicates that either the first half or the complete TCH frame contains signaling information.

The known methods for signaling information in a radio network do have certain disadvantages, like the use of an additional channel, e.g. the SACCH channel. It is another disadvantage, that if the traffic channel itself is used, at least half of the bits of each TCH frame are used for signaling and therefore are no longer available for the transmission of user data. It is a further disadvantage that signaling information being transmitted within one frame is susceptible to errors being caused by bad transmission conditions.

SUMMARY OF THE INVENTION

Accordingly, it is an object of the present invention to provide a method for signaling of information. It is the aim of the inventive method under consideration to avoid the drawbacks known from the state of the art.

The object is achieved by providing a method for signaling of information in a frame based transmission system, whereat the signaling information contains information necessary for the operation of the transmission system, having steps of inserting signaling information related to individual frames into said individual frames, and partitioning signaling information and inserting said partitioned signaling information into different frames.

It is an other object of the present invention to provide a system for signaling of information. It is the aim of the inventive system under consideration to avoid the drawbacks known from the state of the art.

The object is achieved by providing a frame based transmission system for signaling of information, whereat the signaling information contains information necessary for the operation of the transmission system, having means for coding and decoding of data, means for handling the coded data in frame format, and means for transmitting and receiving the frames, characterized by means for inserting and evaluating signaling information into and from individual frames related to said individual frames, and means for partitioning signaling information and inserting and evaluating said partitioned information into and from different frames It is advantage of the present invention, that if facilitates highly protected and highly reliable signaling requiring only a minimum of bits. It is another advantage of the present invention, that it easily allows the detection of the signaling bits as the synchronization already available from the transmission system and the frame structure of the transmission system is used for the signaling information.

The present invention will become more fully understood from the detailed description given hereinafter and further scope of applicability of the present invention will become apparent. However, it should be understood that the detailed description is given by way of illustration only, since various changes and modifications within the spirit and scope of the invention will become apparent to those skilled in the art.

BRIEF DESCRIPTION OF THE DRAWINGS

The following detailed description is accompanied by drawings of which

FIG. 2 represents a signaling example according to the data structure of FIG. 1 in greater detail.

DETAILED DESCRIPTION

Following, the inventive method and system for signaling of information are explained with reference to a cellular radio network according to the GSM standard. However, it should be understood, that the present invention also is applicable to other transmission systems. The GSM standard is well known, see e.g., "The GSM System for Mobile Communications", M. Mouly, M.-B. Pautet, Palaiseau, 1992, ISBN 2-9507190-0-7, which is incorporated by reference herein.

The information which is signaled characterizes different codec modes for coding and decoding source coded user data, i. e. speech, in this example and will be referenced as adaptive multi-rate coding (AMR). The AMR principle is used for modeling a transmission system that shows graceful degradation in case of deteriorated transmission conditions. If the transmission conditions deteriorate the bit rate used for transmission of source coded user data, e. g. speech, is decreased and the bit rate used for channel coding, i. e. the protection of the user data, is increased. Several AMR modes can be used, depending on the deterioration of the transmission conditions. In the moment there are defined four modes plus two additional modes for expansion. Greater detail of AMR can be found in "Adaptive Multi-Raten Sprachcodierung für zukünftige GSM-Systeme", Karl Hellwig, ITG-Fachtagung 3.-5. March 1998, Aachen, ITG-Fachbericht 146, pages 173-176, which is incorporated by reference herein. Other signaling aspects of AMR, e. g. signaling for the selection of one of the available channel types, half rate or full rate, will not be explained in the following, as these aspects are not relevant for the understanding of the present invention.

Figure 1:
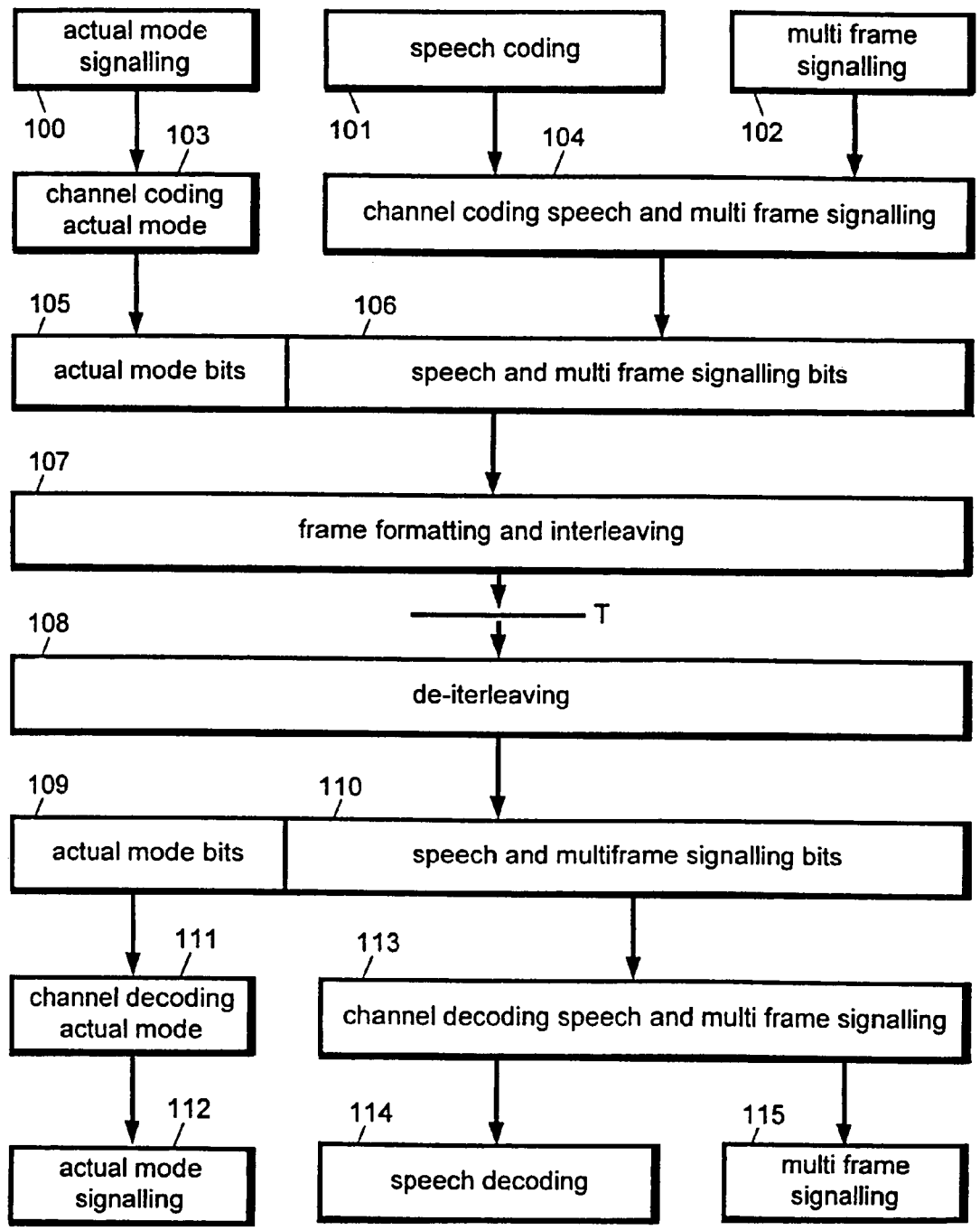
FIG. 1 represents a data structure for signaling information according to this invention.

FIG. 1 shows data structure for signaling information according to the present invention, especially information on the AMR coding mode called coding mode in the following. The structure shown represents the signaling from the fixed part of the radio network to the mobile part, i.e. data are transmitted from the fixed part to the mobile part. User date, i.e. speech, is being source coded in a speech coding step 101 using one mode of available modes for speech coding according to the selected coding mode. By example, six different coding modes can be used. In this case three bits are necessary for coding the six different coding modes. When the transmission is started the pre-selected coding mode can be the coding mode offering the lowest bit rate for speech. The coding mode can be changed if necessary as will be explained later. According to the selected coding mode the speech coded data from step 101 is channel coded together with at least one additional bit derived from a multi-frame signaling step 102 in a channel coding step 104, forming speech and multi-frame signaling bits 106. The additional bit from step 102 is a part of the three bit information used for coding additional signaling information. In the present example it represents the six different coding modes available or measurement information. In this example it takes three frames within a multi-frame of six frames, as e.g. defined and used according to the GSM standard, to transmit the coding mode information as within each frame only one of three bits is transmitted, thus providing additional protection for the transmitted coding mode information. Due to the fact that the one bit used per frame is in addition protected by the channel coding step 104, total protection is further increased.

For each data frame actual coding mode bits are generated in an actual mode signaling step 100 according to the coding mode selected for the data frame. As explained above, for characterizing the coding mode three bits are used. The coding mode bits derived from step 100 are channel coded in a channel coding step 103. For channel coding e. g. eleven additional bit are used in this example to form fourteen actual mode bits 105. In a frame formatting and interleaving step 107 the actual mode bits 105 and the speech and multi-frame bits 106 are formatted and interleaved for a transmission step T. As the bits added for signaling are inserted into the data frame structure of the transmission system, the synchronization for the added bits is automatically provided by using the given synchronizing mechanisms.

After transmission of the bits a de-interleaving step 108 is used to recover actual mode bits 109 and speech and multi-frame signaling bits 110. From the actual mode bits 109 in a channel decoding step 111 the three bits for actual mode signaling 112 are recovered. From the speech and multi-frame signaling bits 110 in a channel decoding step 113 the source coded user data 114, e. g. speech, and the multi-frame signaling 115 are recovered.

If, instead of the above described transmission direction from the fixed part of the radio network to the mobile part (downlink), the transmission direction is reversed to the direction from the mobile part to the fixed part of the network (uplink), the actual mode bits 105 also contain the coding mode used for the respective frame as coded in the mobile part, but the multi-frame signaling bits 102 transmitted in three consecutive frames contain a quality measurement of the downlink, as measured by the mobile part at reception thereof. For the measured quality of the downlink eight different levels can be assigned as three bits are used for multi-frame signaling.

All above used steps of coding, decoding, transmission etc. are per se well known and are explained e. g. in greater detail in the above mentioned documents.

Looking now to FIG. 2, the data structure for signaling as explained above will be explained in greater detail. FIG. 2 shows the signaling for nine consecutive data frames 0 to 8. In the example shown it is assumed that the fixed part of the network and the mobile part use the same coding mode for the transmission of data in downlink and uplink, this is also referred to a symmetrical operation. It should be noted that it is also possible that the fixed part of the network uses a coding mode for the downlink different from the coding mode used by the mobile part for uplink. In this case an actual mode signaling codeword for the downlink is different in general compared to an actual mode signaling codeword for the uplink. The table of FIG. 2 has in its first column the frame number of the transmitted data frame; in its second column the three bit actual mode codeword used for signaling of the coding mode for the downlink; in its third column the multi-frame signaling bit used for characterizing the coding mode command for the uplink sent in the downlink; in its fourth column the three bit actual mode codeword used for signaling of the coding mode for the uplink; in its fifth column the multi-frame signaling bit of the uplink used for characterizing the transmission quality of the downlink as received and measured by the mobile part; and in its sixth column the action regarding change of used coding mode.

For the first three frames 0 to 2 the actual coding mode is Mode 3, characterized by bit sequence 010, for both the codewords of downlink and uplink. As no change of coding mode is necessary for the next three frames 3 to 5 the sequence of the multi-frame signaling bits of the downlink also is 010, Mode 3. In the example shown in the first frame 0 the least significant bit (LSB) is transmitted while the most significant bit (MSB) is transmitted in the third frame 2. In the same way the quality measurement is signaled in the uplink, LSB in the first frame 0, MSB is the third frame 2. The sequence 110 as shown in FIG. 2 is an assumed value and merely for explanation. Within the consecutive three frames 3 to 5 it is signaled that the frames 6 to 8 will have a different coding mode. To accomplish this the bit sequence of the multi-frame signaling bits is changed to 001 to represent Mode 2. For the frames 6 to 8 Mode 2 is used as coding mode.

The coding modes used both in downlink and uplink are determined by the fixed part of the network. To determine the coding modes the transmission quality of downlink and uplink are analyzed. The quality of the uplink is measured by the fixed part of the network, the quality of the downlink is—as explained above—measured by the mobile part and transmitted to the fixed part of the network using the multi-frame signaling bits of the uplink.

The decoding mode used in the fixed part of the network for the data received from the mobile part is determined by the actual mode signaling codeword contained in the uplink. For error checking the received codeword can be compared to a determined codeword of a previous frame, as the code mode can not change during three frames. The decoding mode used in the mobile part for the frames received from the fixed part of the network is determined by the actual mode signaling codeword contained in the downlink. In symmetrical operation, i. e. the same mode is used for downlink and uplink, the received codeword of the downlink can be compared to the mode command sent previously on the downlink during three previous frames. In that way, a very high protection for the signaled modes used for coding and decoding is achieved with a small number of bits, which is important as using different modes for coding and decoding would lead to a destruction of the user data. In case of symmetrical operation, as mentioned above, several strategies can be applied by using the proposed coding scheme of actual code mode word and the partitioned code mode bits. In case of error for, e. g. several frames, either the previous coding mode transmitted in the partitioned code mode bits can be kept for uplink and downlink or the coding mode can be decreased towards more channel coding protection of the speech bits.

Figure 3:
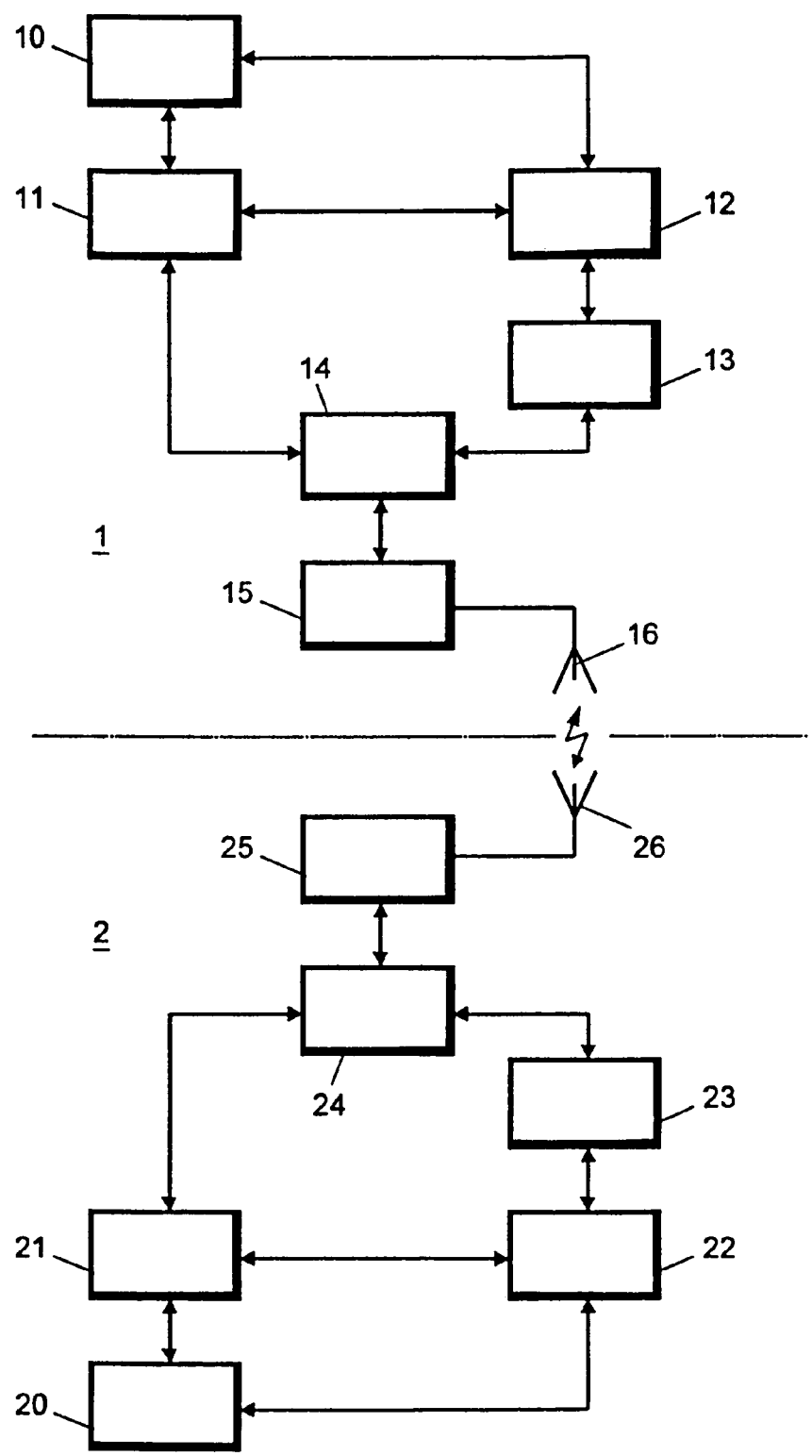
FIG. 3 represents a schematic diagram of a system for signaling information according to this invention.

FIG. 3 is a schematic diagram of a system for signaling information according to this invention. A fixed part of the network 1 and a mobile part 2 are depicted. Both parts have a source coder/decoder 10, 20, e.g. for speech, a first channel coder/decoder 11, 21, a coding mode means 12, 22, a second channel coder/decoder 13, 23, a formatting and interleaving/de-interleaving means 14, 24, a transceiver 15, 25, and an antenna 16, 26. Several other elements are used in the fixed part of the network 1 and the mobile part, e.g. an equalizer is used within the transceivers 15 and 25, for the sake of an easier understanding of the present invention these elements are not shown as they are not relevant for this invention. For greater detail of the radio network reference is made to the mentioned state of the art.

For downlink transmission, i. e. in case the fixed part 1 transmits data frames to the mobile part 2, user data, e. g. speech, is coded by speech coder 10 using a coding mode as indicated by coding mode means 12. The output of speech coder 10 is channel coded by channel coder 11. As explained above, to the output of speech coder 10 at least one bit is added which is part of the multi-frame signaling bits. The additional bit is being generated by the coding mode means 12 according to the used coding mode for the next frames. The coding mode means 12 also generates the three actual mode bits, as explained above. The actual mode bits are channel coded by channel coder 13, e. g. a block coder. The outputs of channel coders 11 and 13 are fed to the formatting and interleaving means 14 which forms a data frame for transmission, e. g. a transmission frame according to the above mentioned GSM standard. The transmission frame then is transmitted from transmitter 15 and antenna 16. At the mobile part 2 the transmitted signal, i. e. the transmission frame, is received by antenna 26 and receiver 25. The transmission frame is de-interleaved by the de-interleaver 24. The channel coded actual mode bits are coupled to the channel decoder 23. The decoded actual mode bits are fed to the coding mode means 22. The coding mode means 22 provides information on the coding mode used in each frame to the channel decoder 21 and to the speech decoder 20 for decoding each individual frame.

As explained above with reference to FIGS. 1 and 2, the coding mode used at the side of the fixed part 1 of the network for coding the frame which is processed now at the mobile part 2 is identified by the coding mode means 22 analyzing the actual coding mode bits as well as the multi-frame signaling bits, which in this example are transmitted one bit each in subsequent frames. As also explained above, the synchronization for bits added for signaling is automatically provided by using the given frame structure.

For uplink transmission, i. e. the mobile part 2 transmits data frames to the fixed part 1 of the network data, e. g. speech, is coded by the speech coder 20 using a coding mode as indicated by coding mode means 22. The output of speech coder 20 is channel coded by channel coder 21. As explained above, to the output of speech coder 20 at least one bit is added which is part of the multi-frame signaling bits. The additional bit is being generated by the coding mode means 22 according to the reception quality as estimated for the downlink from measurements in the mobile part 2 and the fixed 1 part of the network. The coding mode means 22 also generates the three actual mode bits indicating the coding mode used for coding of the actual frame, as explained above. The actual mode bits are channel coded by channel coder 23, e. g. a block coder. The outputs of channel coders 21 and 23 are fed to the formatting and interleaving means 24 which forms a data frame for transmission, e. g. a transmission frame according to the above mentioned GSM standard. The transmission frame then is transmitted from transmitter 25 and antenna 26. At the fixed part 1 of the network the transmitted signal, i. e. the transmission frame, is received by antenna 16 and receiver 15 which e. g, also measures the quality of the uplink, The transmission frame is de-interleaved by the de-interleaver 14. The channel coded actual mode bits are coupled to the channel decoder 13. The decoded actual mode bits are fed to the coding mode means 12. The coding mode means 12 provides information on the coding mode used in each frame to the channel decoder 11 and to the speech decoder 10 for decoding each individual frame.

As explained above with reference to FIGS. 1 and 2, the coding mode used at the side of the mobile part 2 for coding the frame which is processed now at the fixed part 1 of the network is identified by the coding mode means 12 analyzing the actual coding mode bits as well as the previously decided coding mode for the uplink. As mentioned before, the coding modes for uplink and downlink are decided at the side of the fixed part 1 of the network based on the transmission quality for uplink and downlink. As also explained above, the synchronization for bits added for signaling is automatically provided by using the given frame structure.

The invention claimed is:

1. A method of transmission in a multi-frame system, each frame of the multi-frame system being associated with a first type of control information, there further being provided a second type of control information comprising a code word, the method comprising:
    a. partitioning the second type of control information into a number of sections;
    b. forming a plurality of consecutive data frames for transmission, the number of consecutive data frames corresponding to the number of sections into which the code word is partitioned; and
    c. transmitting with each frame of the plurality of consecutive data frames in the multi-frame:
        i. the first type of control information for the respective frame; and
        ii. a section of the partitioned second type of control information.

2. A method according to claim 1 wherein the second type of control information is for use on receipt of the multi-frame.

3. A method according to claim 1 further comprising the step of, on receipt of the multi-frame, reforming the second type of control information.

4. A method according to claim 1 wherein the transmission is in a downlink of a communication system, the first type of control information representing a coding mode applied in the downlink, and the second type of control information representing a coding mode to be applied in an uplink of the communication system.

5. A method according to claim 1 wherein the transmission is in an uplink of a communication system, the first type of control information representing a coding mode applied in the uplink, and the second type of control information representing a downlink quality measured in the downlink.

6. A method according to claim 1 wherein the step of transmitting further comprises transmitting data with each frame.

7. A method according to claim 6 wherein the step of transmitting comprises channel encoding said data and said section of the second type of control information.

8. A method according to claim 7 further comprising channel coding the first type of control information.

9. A method according to claim 8 further comprising frame formatting and interleaving the channel coded first type of control information, data, and section of the second type of control information.

10. A method of transmission in a multi-frame system, each frame of the multi-frame system being associated with a first type of control information, there further being provided a second type of control information comprising a code word, wherein each frame of a plurality of consecutive frames in the multi-frame sequence is transmitted with the first type of control information for the respective frame; and a section of a partitioned second type of control information the number of frames of the plurality of consecutive frames in the multi-frame sequence corresponding to the number of sections into which the control information is partitioned, the method comprising:
   a. receiving frames of the multi-frame; and
   b. reforming the sections of the second type of control information into the code word.

11. A method according to claim 10 further comprising the step of decoding the received frames in accordance with a mode code derived from the first type of control information for each frame.

12. A method according to claim 10 further comprising encoding frames for transmission depending on the reformed code word.

13. A communication device for a multi-frame transmission communication system, each frame of the communication system being associated with a first type of control information, there further being provided a second type of control information comprising a code word, the communication device comprising:
   a. partitioning means adapted to partition the second type of control information into a number of sections corresponding to a number of a plurality of consecutive frames in the multi-frame;
   b. transmitter means adapted to transmit with each of the plurality of frames of the multi-frame:
     i. the first type of control information for the respective frame; and
     ii. a section of the second type of control information.

14. A communication device for a multi-frame transmission communication system, each frame of the communication system being associated with a first type of control information, there further being provided a second type of control information comprising a code word, wherein each frame of a plurality of consecutive frames in the multi-frame transmission communication system is transmitted with the first type of control information for the respective frame; and a section of a partitioned second type of control information, the communication device comprising:
   a. receiving means for receiving frames of the multi-frame; and
   b. reforming means for reforming the sections of the second type of control information into the code word.

15. A multi-frame transmission communication system, each frame of the communication system being associated with a first type of control information, there further being provided a second type of control information comprising a code word, the communication system comprising:
   a. a first device having a partitioning means adapted to partition the code word of the second type of control information into a number of sections, and transmitter means adapted to transmit with each frame of the sequence of consecutive frames in the multi-frame, the first type of control information for the respective frame, and a section of the second type of control information wherein each section is placed in a separate frame in a sequence of consecutive frames, the number of sections corresponding to the number of frames in the sequence of frames; and
   b. a second device having a receiver means adapted to receive frames of a multi-frame transmission from the first device, and means for reforming the partitioned second type of control information into the code word.

16. A multi-frame transmission communication system according to claim 15 wherein the second device is adapted to decode the frames of the multi-frame transmission in dependence on the first type of control information contained in a received frame.

17. A multi-frame transmission communication system according to claim 16 wherein the second device further comprises encoding means for encoding data for transmission using a mode code based on the reformed code word and transmission means for transmitting the encoded data to the first device.

18. A multi-frame transmission communication system according to claim 15 wherein the first device is a fixed part of the communication system and the second device is a mobile part of the communication system and there is an uplink established from the mobile part of the communication system to the fixed part of the communication system.

19. A multi-frame transmission communication system according to claim 15 wherein the first device is a fixed part of the communication system and the second device is a mobile part of the communication system and there is downlink established from the fixed part of the communication system to the mobile part of the communication system.

* * * * *